United States Patent [19]

Haley

[11] 4,080,740
[45] Mar. 28, 1978

[54] WEB CENTERLINE LOCATING SYSTEM

[76] Inventor: Ernest K. Haley, 1210 Old Cannons La., Louisville, Ky. 40205

[21] Appl. No.: 766,828

[22] Filed: Feb. 8, 1977

[51] Int. Cl.$^2$ ............................................. G01B 5/02
[52] U.S. Cl. ................................... 33/174 L; 33/191
[58] Field of Search .................... 33/189, 191, 174 L, 33/174 G, 174 R

[56] References Cited

U.S. PATENT DOCUMENTS 3,874,086  4/1975  Ludlam ................................. 33/189

Primary Examiner—William D. Martin, Jr.
Attorney, Agent, or Firm—David H. Semmes

[57] ABSTRACT

A web centerline locating system which automatically determines the centerline of the vertical thickness of a web in a structural steel member, and the like, and in combination with a gauging system for accurately locating a vertically moveable drilling head, with respect to that centerline. The device further includes a bellis mechanism which is activated by the vertical movements of the probes as they contact the web thickness, so that a center section of the bellis will be referrable to the vertical position of the centerline of the web thickness. The center section of the bellis is directly connected to an indicator means which indicates and references the various vertical positions assumed by the center section to an external standard, for establishing the exact vertical position of the web centerline. The invention also includes the combination of a web centerline locating system with an associated horizontal drilling assembly, so that the referenced vertical position of the web may be employed to accurately position a horizontal drill assembly for flange drilling on structural members, regardless of size or alignment errors characteristic of structural members.

11 Claims, 3 Drawing Figures

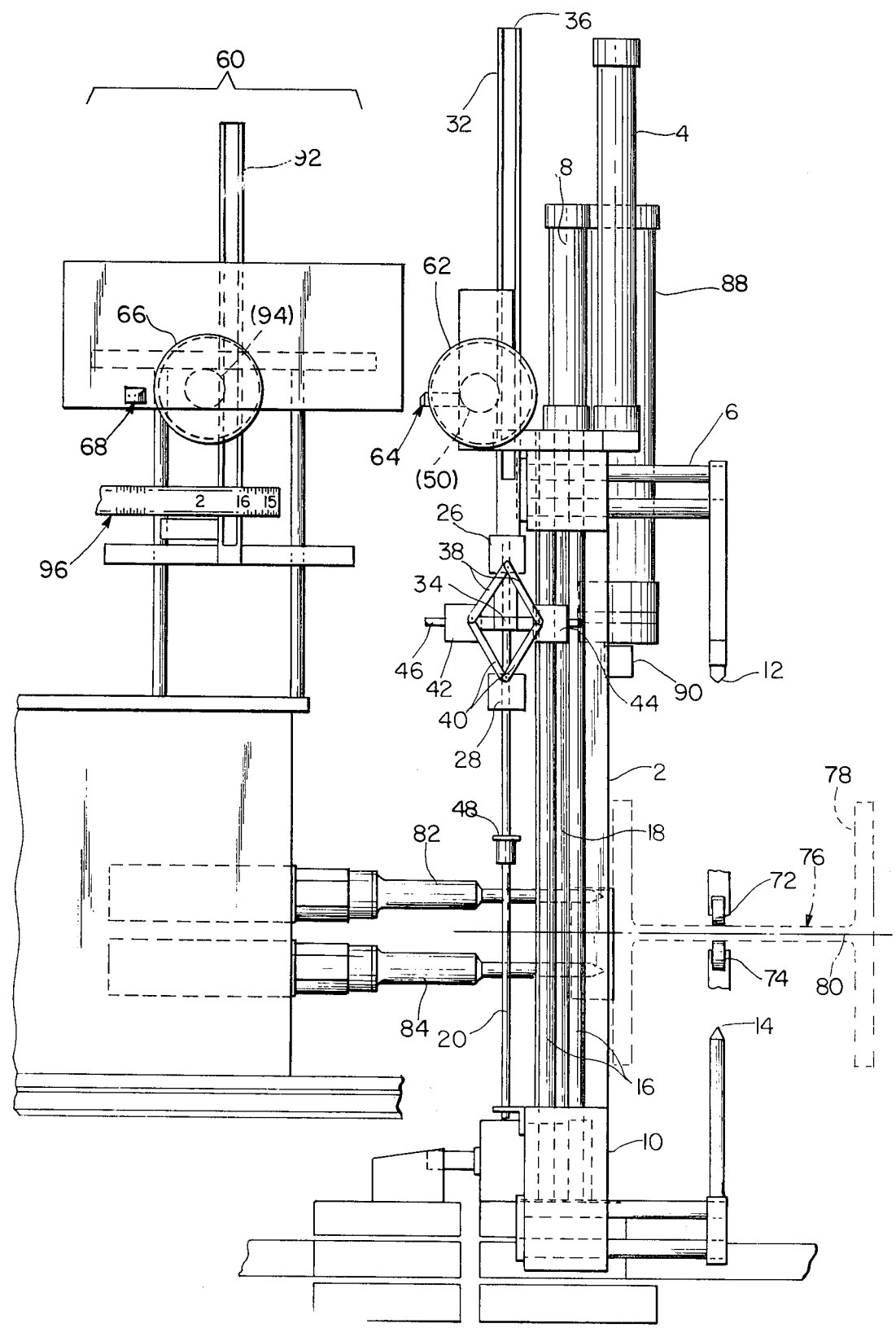

WEB CENTERLINE LOCATING SYSTEM

BACKGROUND OF THE INVENTION

1. Field of the Invention

The present invention is a web centerline locating system, and which particularly allows for a quick and positive establishment of the vertical location of the center of a web thickness. The present invention allows rapid determination of a reference point for drilling holes in the flanges of such structural shapes as I-beams, by ensuring that the flange holes will be accurately gaged on either side of the web between the flanges. The present invention includes the web centerline locating system in combination with a coordinated drilling assembly, wherein a horizontal drill assembly may be accurately placed for drilling holes into vertical flange surfaces of structural members, with the holes being accurately gaged on either side of the horizontally extending web of the member, regardless of manufacturing errors in the structural member itself.

2. Description of Prior Art

There is not known to be a prior art web centerline locating system which employs two opposed probes for contacting the top and bottom surfaces, respectively, wherein the vertical position of the centerline of the web is mechanically referenced through a bellis device. From a search of prior art, applicant has discovered the prior United States patents, as follows: U.S. Pat. Nos.: KRIVACS; 1,410,196, BETHEN; 2,348,878, KEYS; 2,660,802, SLAMAR; 3,065,415, ERTMAN; 3,562,918, LEMELSON; 3,805,393.

The early patent to Krivacs illustrates one form of center gage where the distance between pads, 10, will be divided and indicated by a pointer, 1. As such, Krivacs illustrates the principle of mechanically determining a centerline between two measured points, although he does not provide a system for indicating and referencing a centerline to an external standard, as is particularly taught herein.

The patent to Behen illustrates another form of centerline locating device, per se, one which is structurally adapted for determining the centerline of a square surface by elements positioned at the intersection of the diagonals of the square to be centered. As such, Behen simply further illustrates a device for mechanically dividing distances between particular points.

The patent to Keys is categorically pertinent because he illustrates a marking gage to locate the centerline of the web upon the flanges of I-beams, and the like. Keys' device is representative of the prior art approach of manually scribing a line, directly upon the flange of the I-beam. In contrast, with the present invention an accurate vertical position for the centerline of a web may be externally referenced by a simply probing, without requirement of physically marking the flange at a centerline position. The Keys marking gage requires that the distance between the scribe, 3, and the screws, 10, be set for the centerline of a given web, 1, so that any variation in web thickness will not be accounted for during the scribing operation. In contrast, the present invention accurately determines a centerline for any given web thickness, without the necessity of knowing or sensing what the value of the thickness is. Additionally, the centerline location is always referenced to an external, vertical standard.

The patent to Slamar illustrates an electro -- mechanical device for determining variations in the thickness of the web of an I-beam, for example, as it travels over a conveyor. Slamar's device is, therefore, concerned with monitoring thickness variations in structural steel dimensions, and not with referencing the location of the centerline of any thickness to an external standard, so that a drill assembly may be accurately referenced with respect to that vertical location. Slamar is pertinent insofar as he illustrates that the position of a rack, 7, may be translated, through pinion, B, by an electric pulse circuit. The present invention, in one embodiment, may similarly employ an encoder to generate electrical pulses, in response to the vertical position of an indicator rack, so that such an electrical single output can be processed in any number of ways to represent the vertical location of the centerline of the web.

The patent to Ertman illustrates a device for determining both dimensional accuracy and symmetry deviation of any part of a structural member, through a plurality of contacts between probes and surfaces on the structural member. For example, the probes P-5 and P-6, shown in FIGS. 2A and 8, are connected to transducers, to produce signals which are then electronically processed to indicate, for example, that deviation of the thickness of a web from a derived horizontal centerline, as shown at B—B in FIG. 8. In contrast, the present invention requires only a bellis assembly to mechanically derive the vertical location of the centerline of the web, with that vertical location being calibrated to an external standard. This feature is significant in the present invention, because the vertical location of the centerline of the web may then be used to easily position a horizontal drill assembly. Thereby, the holes drilled into the flange will be accurately referred to the centerline of the web at that position on the structural member. The problems addressed by the present invention require simply the establishing of an external reference point for the location of the centerline of the web in a structural member, and the present invention simply and efficiently creates such an external reference to the vertical location of the web centerline, without the need for involved electrical or mechanical subsystems.

The patent to Lemelson is electro-mechanical device for primarily determining dimensions of a given member, and not with simply establishing the vertical location of the centerline of an horizontally disposed web. Lemelson is considered illustrative of an automatic caliper wherein electrical signals are generated from the positions of mechanical probes, hence, he illustrates various logic subsystems for translating mechanical movement into electrical outputs. By contrast, the present invention is specific to a device for mechanically determining the physical location of the centerline in a horizontal member, without regard to the actual dimension of the centerline. The present invention allows for a centerline to be quickly and efficiently referenced to an external standard, without the need of initially determining what the thickness of a web is, at any given point along a structural member. Hence, the present invention is structurally adapted for centerline location determination, and does not also require the monitoring of any particular dimension of a structural steel member for conformance to tolerances.

SUMMARY OF THE INVENTION

The present invention is a web centerline locating system, and one which simply and easily gives an external reference which may then be used to position horizontally-disposed drilling heads for accurate flange hole location, even with flanges out-of-square with the web. The present invention employs a pair of probles; a first probe that contacts the top side of a horizontally disposed web, of a structure such as a I-beam, and a second probe to contact the bottom side of the web. Mechanically interconnected with vertically positionable probes is a bellis assembly, so that the respective vertical positions of the top and bottom probes will be mechanically translated to the bellis assembly. The bellis assembly includes a first bellis block which is mechanically interconnected with the top probe, and the bellis further includes a second bellis block which is adapted to be contacted upon upward movement of the bottom probe. Therefore, the position of the first bellis block is directly referrable to the vertical position of the distal end of the top probe, and the second bellis block is directly referrable to the vertical position of the distal end on the bottom probe. Between the two bellis blocks is a bellis center section, which is interconnected to each of the bellis blocks so that it will always be positioned equidistant between any vertical positions of the first and second bellis blocks. Clearly, as used herein, the term 'bellis' refers to the above-described combination of a four bar linkage with a center section which mechanically divides the space between upper and lower blocks which travel on a vertically disposed shaft.

An indicator rack is attached to the center section of the bellis assembly, so that the vertical position of the rack will be mechanically referrable to the vertical position of the centerline of the web of the structural member being probed. The vertically disposed indicator rack may be connected, through a pinion, to an encoder, which will generate an electrical representation of the vertical position of the rack, as is well-known. Alternatively, in the preferred embodiment, the vertical rack will turn a pinion that rotates an indicia-carrying disc which is calibrated to a reference marker; so that a value for the vertical location of the web centerline will be visually available. The present invention further contemplates a vertically movable drill head assembly, with the drill assembly including one or more horizontally disposed drill spindles. In the preferred embodiment, the auxiliary drill head assembly includes a second vertically disposed indicator rack and pinion calibration assembly, so that the established value for the vertical location of the centerline may be transferred to the drill head assembly. Hence, the drill spindles may be accurately positioned to the referenced vertical location of the web centerline, when drilling flange holes at any point on the length of the structural member.

It is also an object of the present invention to employ a mechanical bellis assembly that is directly contacted by vertically movable top and bottom probes, in order to mechanically divide the probed thickness of a horizontally disposed web in structural member, and to mechanically translate the accurate vertical location of this centerline to a calibrated indicator means.

It is a further object of the present invention to easily reference the vertical location of the centerline of a web in a structural member, without need to initially determine the thickness of the web; thereby avoiding the need for involved mechanical or electrical subsystem operations which would not be helpful to the purpose which the present invention is directed.

It is a still further object of the present invention to provide a mechanical measuring system which will reliably reference the vertical location of the centerline of a web to a calibrated numerical value, so that this numerical value may be directly used as the input to a vertically adjustable horizontal drill assembly, when combined with the web centerline locating device.

BRIEF DESCRIPTION OF THE DRAWINGS

FIGS. 1 and 2 illustrate a front and side view of an embodiment according to the principles of the present invention;

DESCRIPTION OF THE PREFERRED EMBODIMENTS

Figure 3:
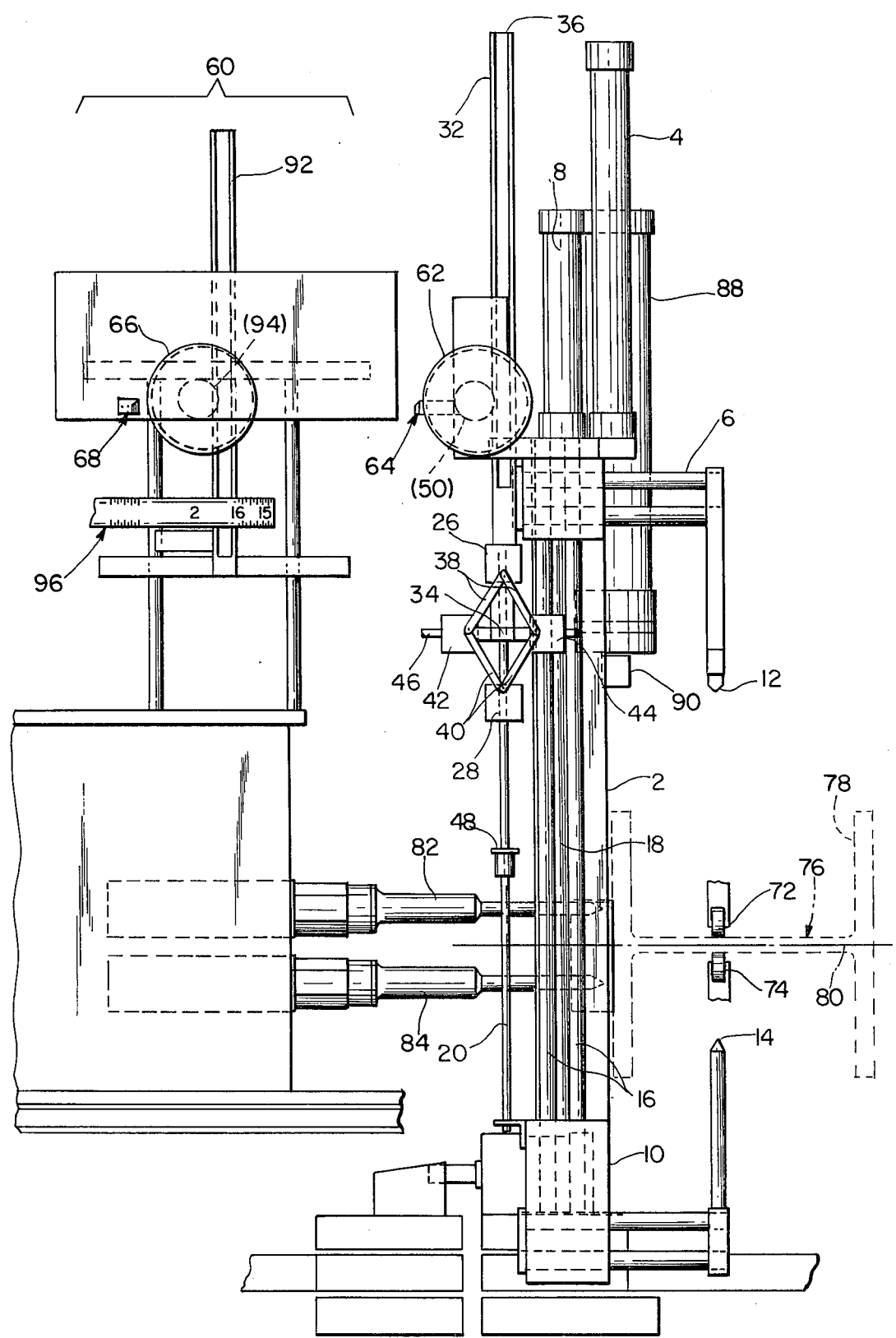
FIG. 3 illustrates a second embodiment of the present invention as the combination of a web centerline locating device and an associated vertically adjustable horizontal drilling head assembly.

The present invention includes a web centerline locating system for creating an external reference for the vertical position of the centerline of any given vertical thickness in a horizontal web, when presented horizontally disposed in structural steel members such I-beams, and the like. The present invention also includes the web centerline locating system in combination with a horizontal drill spindle assembly, so that the externally referred location of the web centerline may be referenced to the vertical position of the horizontal drill spindle assembly. FIGS. 1 and 2 illustrate a first embodiment of the web centerline locating system. A vertically disposed frame, 2, is adapted to support a first actuator means, 4, and a second actuator means, 8. First actuator, 4, is preferably a hydraulic cylinder which includes a piston rod that is directly connected to the proximate end of a first probe assembly, 6. In like fashion, the second actuator, 4, may be a hydraulic cylinder that includes a piston rod, 18, that is directly connected to the proximate end, 22, of a second probe assembly, 10. The first or top, probe assembly, 6, includes a probe contact point, 12, at its distal end, thereof, and the second, or bottom, probe assembly, 10, includes a bottom probe assembly contact point, 14, at its distal end.

The top probe assembly, 6, is constrained to move in a vertical direction by the vertically disposed guide rods, 16, and the bottom probe assembly, 10, is similarly constrained to move in a vertical assembly by the same guide rods, 16. The top probe contact, 12, and the bottom probe contact, 14, are thereby constrained for a co-linear vertical movement, with the top contact point, 12, extending downwardly for a vertical movement which is above the upwardly extending contact point, 12, on the distal end of the second probe assembly, 10. The bottom probe assembly, 10, also includes, at its proximate end, 22, a bellis vertical guide bar which is rigidly affixed thereto. The bellis guide bar, 20, is a one-piece rod which may be supported through a bushing surface in the support frame assembly, 2, in the vicinity of the linear actuators, 4 and 8.

The bellis assembly comprises a first bellis block, 26, and a second bellis block, 28, with both of these bellis blocks being freely slideable along the bellis guide bar, 20. A bellis center section is also slideably disposed upon the guide bar, 20, and the bellis center section, 30, is interconnected to the first and second bellis blocks in a manner which will ensure that the center section, 30, will be maintained equidistant between the various vertical positions which are assumed by the first bellis block, 26, and the second bellis block, 28.

As shown most clearly in FIG. 1, the interconnection means comprises a first pair of bellis supporting arms, 38, and a second pair of bellis supporting arms, 40. The first ends of the first pair of supporting arms, 38, are commonly mounted to the first bellis block, 26, to be pivotable in a vertical plane about a first horizontal axis in the first bellis block, 26. In symmetrical fashion, the second pair of bellis supporting arms, 40, are commonly mounted at their respective first ends to the second bellis block, 28, so that they will also pivot, in a vertical plane, about a second horizontal axis on the second bellis block. The four bellis supporting bars visible in FIG. 1 are of equal length, to thereby define a four-bar linkage between the first bellis block, 26, and the second bellis block, 28. As shown by FIG. 2, a second four-bar linkage arrangement may be directly behind the four bar linkage which is visible in FIG. 1.

The bellis center section, broadly indicated at 30, includes a guide hole to allow free passage of the bellis vertical guide bar, 20, therethrough. Extending horizontally from either side of the bellis center section, 30, is a stub shaft, or rod, 46, to constrain the third bellis block, 42, and the fourth bellis block, 44, for horizontal movement. Therefore, the bellis will be freely slideable on the guide rod, 20, and any relative contraction between the first and second bellis blocks will maintain the geometric center of the bellis center section equidistant between the first and second bellis blocks. At the geometric center of the bellis center section, 30, is the proximate end of a vertically disposed rack, 32. The vertical indicator rack, 32, is connected at its proximate end, 34, directly to the bellis center section, 30. As shown most clearly in FIG. 2, the indicator rack, 32, has a toothed surface in mating engagement with a pinion gear, 50. Pinion gear, 50, rotatably engaged by the indicator rack, 32, is connected to a calibration means for outputing an indication of the vertical location of the geometric center of the bellis center section, 30. One form of calibration means may be an encoder or the like, 52, which will output an electric signal in response to the rotation of the pinion gear, 50. Such devices are conventional in the art, as discussed above in the description of the prior art. The calibration means, 52, is rigidly mounted upon the frame, 2, of the entire assembly, so that the frame of the assembly acts as a reference point for the vertical location of the center section of the bellis device.

As illustrated in FIG. 2, the first bellis block, 26, is contacted at its upper end by a proximate portion of the top probe assembly 6. In the embodiment of FIG. 2, the top bellis block, 26, is bolted to a flange, 54, so that the fully slideable bellis assembly is downwardly suspended upon the guide rod, 20, when the probes are in the non-functioning position illustrated in FIG. 2. A lower probe bellis actuator, 48, may be employed to be the contact element between the vertically moving lower probe assembly, 10, and the lower surface of the second bellis block, 28. The lower probe actuator, 48, may be fixed or adjustable to accommodate different elevations of a web thickness. It should be noted that the vertical spacing between the distal end of the top probe, 12, and the connecting flange, 54, is fixed, and may be of any chosen value. As the top probe assembly is vertically moved on the guide rods, 16, the first bellis block, 26, will be moved exactly the same vertical distance. As the distal end of the lower probe, 14, is urged into a bottom contact with a horizontal web thickness, the guide rod, 20, will slide freely within the bellis assembly until the actuator, 48, contacts the lower surface of the second bellis block, 28. The distance between the top of the first bellis block, 26, and the bottom of the second bellis block, 28, defines the maximum actual thickness of a web which may be accurately sensed, and mechanically divided by the device illustrated in FIGS. 1 and 2. The fixed position of the actuator, 48, on the bellis guide rod, 20, have no effect on the thickness which the bellis assembly can accurately divide, and rather simply allows for adjustment of the point at which the first and second bellis blocks will be compressed upon the respective probe contacts. For example, if an I-beam is presetned to this device in a plane which is relatively higher than normal, the bellis block may be moved upwardly on the guide bar, 20, to allow for the sensing presented to this device in a plane which is relatively higher. Thereby, the present invention is commonly referrable to a fixed reference, the supporting frame, 2, and may be quickly accommodated to probe horizontally presented web thicknesses that may be presented at varying heights, relative to the support frame, 2, which is mounted on a floor source.

In the preferred embodiment of FIG. 3, the invention is illustrated to include the combination of a web centerline locating system in combination with a vertically adjustable horizontal drill spindle assembly, 60. In the preferred embodiment of FIG. 3, elements which are identical to the embodiment of FIGS. 1 and 2 are identified with like reference numbers, for consistency. In this preferred embodiment, the calibration means may be a manual type, with the pinion, 50, rotating an indicia-carrying disc, 62. The indicia may be arbitrary values, and be referenced to a fixed reference marker, 64. An operator can thereby visually determine a given value for the vertical location of the web centerline, since the position of the web centerline will be directly referrable to the vertical position of the indicator rack, 36.

To illustrate operation of both embodiments there is illustrated in FIG. 3 a horizontally-presented web, 76, as part of a structural steel I-beam, 78. The I-beam is carried upon a roller table so that various points of the web thickness, 76, may be sensed coincidentally with the drilling of horizontal holes into the upstanding vertical flanges on the I-beam. In order to accurately locate the gage of the holes, on either side of the actual vertical location of the web centerline, 80, it is necessary to establish an external reference for the drill assembly. This web thickness centerline, 80, has an absolute external reference value, and is determined by a contact of two probe surfaces; the top probe contact, 12, and the bottom probe contact, 14. The top probe is mechanically connected to the top of the bellis assembly, at first bellis block, 26, causing the vertical location of the first bellis block, 26, causing the vertical location of the first bellis block, 26, to be exactly referrable to the vertical location of the top probe, 12, as it contacts the upper surface of the web, 76. The bottom probe assembly, 10, is rigidly connected to the bottom of the bellis guide bar, 20, at its proximate end, and includes a probe contact surface, 14, at its distal end. Also connected to the bottom of the bellis guide bar, 10, at its proximate end, and includes a probe contact surface, 14, at its distal end. Also connected to the guide bar, 20, is the bellis actuator, 48, so that a certain vertical movement of the guide bar, 20, will urge the top surface of the bellis actuator, 48, into contact with the bottom surface on the second bellis block, 28. The bellis actuator, 48, is positioned so that the first and second bellis blocks will be in a contracted state before the bottom probe contact, 14, actually engages the bottom surface of the web, 76. Since the top bellis block is always contacted by the top probe, 6, the bellis assembly will hang freely suspended until actuated by the selected position of the bellis actuator, 48. The top probe, 12, is moved downward by the top probe actuator, 4, and the bottom probe assembly, 10, is moved vertically upward by the bottom probe actuator cylinder, 8. There also may be provided a vertical clamp cylinder, 88, which includes an extending piston rod, 90, to clamp the I-beam, 78, during the probing operation.

As the top and bottom probes contact the respective sides of the web, 76, the bellis center section 30, will be automatically positioned midway between the vertical positions of the first and second bellis blocks. Therefore, the actual vertical location of the bellis center assembly, after the probes have contacted the web, will be directly referrable to the actual vertical location of the centerline of the web thickness, 80. Since the indicator rack, 32, is directly connected to the bellis center section, 30, the pinion, 50, will be rotated and allow direct reference of the physical location of the centerline, 80, to an external standard. The calibrations on the disc, 62, may be arbitrary, and manually read by an operator through the provision of a reference marker, 64. The external calibration is a simple matter, since all of the elements of the device are referenced to the support frame, 2. The value which is read opposite visaul reference, 64, may then be transposed to another indicia carrying disc, 66, on the horizontal drill spindle assembly, 60. The spindle head assembly includes a year rack, 92, which is engaged to the pinion gear, 94. Therefore, the value of the vertical location of the centerline, 80, can be directly transposed from the disc, 62, to the drill height adjustment disc, 66, to position the drill spindles 82, 84 on opposite sides of the vertical location of the web centerline, 8. Any form of conventional gearing may be employed between the rack, 92, and the drill spindles, 82 and 84, and due to their conventional nature are not further illustrated. The vertically adjustable drill assembly, 80, may further include a gear mechanism to change the gage of the horizontal spindles, 82 and 84, i.e., the vertical distances assumed by the spindles, 82, 84. For this purpose, a third indicator wheel, 96, may be provided on the drill head assembly 60, so that rotation of the disc, 96, will move the drill spindle, 82, relatively closer or relatively farther away from the drill spindle, 84. Again, the gear train for changing the vertical gage distance between the horizontal spindles, 82, 84, is conventional, and further illustration of such a conventional mechanism is not considered necessary for a complete understanding of the invention. The only requirement of the internal gearing of the vertically adjustable horizontal drill assembly is that the vertical location of the centerline between the drills, 82, 84, be controlled by the drill height adjustment disc, 66, with the relative spacing of the drill spindles, 82, 84, be further modifiable by a second gear train controlled by the gage disc, 96.

FIG. 3 further illustrates an alternative construction for the contact tips on the respective probes. As shown at 72, the top probe may have a contact surface which is a wheel structure, and the bottom probe may have a contact which is also configured with a wheel, 74, to allow a rolling contact as the web, 76, is moved perpendicular to the plane of the drawing.

It should be apparent that the manual embodiment illustrated in FIG. 3 may also be modified so that the calibrated disc, 62, and the calibrated drill height adjustment disc, 66, may be interconnected by electrical means. For example, an encoder may replace the disc, 62, with its electrical pulse output being directly fed to a servo motor connected to the pinion, 94, on the drill head assembly, in a manner already illustrated to be well known in the art.

The embodiments are illustrative of the invention which is defined solely by the scope of the appended claims.

I claim:

1. A web centerline locating system for determining the centerline of the vertical thickness of the web of structural steel members and the like comprising, in combination:
   A. a frame supporting both a first actuator means, connected to the proximate end of a first probe for vertical positioning thereof, and a second actuator means, connected to the proximate end of a second probe for vertical positioning thereof; wherein,
   B. the distal ends of said probes are constrained for a colinear vertical movement, and said first probe distal end is downwardly extending and constrained for a vertical movement which is above an upwardly extending distal end on said second probe, wherein the distal end of the first probe is operable for contact upon the top of a horizontally disposed web, and the distal end of the second probe is operable for contact on the bottom of said web; and,
   C. means for sensing the vertical location of the centerline of said web, said means further comprising a first bellis block, disposed for free vertical travel, and a second bellis block, disposed for free vertical travel colinear with and below said first bellis block, a bellis center section disposed between said first and second blocks with interconnection means to each of said blocks for maintaining said center section equidistant between variable vertical positions of said first and second blocks; and
   D. indicator means operably connected to said bellis center section for indicating and referencing the various vertical positions assumed by said center section; and
   E. first contact means connected to the proximate end of said first probe for determining the vertical locations assumed by said first bellis block, and second contact means connected to the proximate end of said second probe for determining the vertical positions assumed by said second bellis block, whereby, when said first and second probes respectively are urged into contact with a horizontally disposed web, said indicator means is operable to indicate the vertical location of the centerline of the vertical thickness of said web.

2. A web centerline system, as in claim 1, which the interconnection means to said bellis center section further comprises a first pair of bellis supporting arms commonly mounted at their respective first ends to pivot, in vertical plane, about a first common horizontal axis on said first block, and a second pair of bellis supporting arms commonly mounted at their respective first ends to said second bellis block to pivot, in a vertical plane, about a second common horizontal axis on said second block, wherein the second ends of each of said support bars are pivotably connected to said bellis center section, and define a four bar linkage between said first and second bellis blocks.

3. A web centerline system, as in claim 2 wherein each of said four supporting bars are of equal length, and said bellis center section further comprises a horizontally disposed rod having a third and a fourth bellis block horizontally slideable thereon, with the second end of one support, from said first pair of support bars, pivotably mounted together with the second end of one support bar, from said second pair of support bars, upon each of said third and fourth bellis blocks.

4. A web centerline locating system, as in claim 1, wherein said indicator means further comprises a vertically disposed rack which is connected, at a proximate end, to said bellis center section and vertically extends to a distal end, wherein a pinion gear is rotatably engaged by said rack and said pinion is connected to a calibrated means for outputting an indication of the vertical location of said web centerline.

5. A web centerline system, as in claim 4, wherein said calibrated means is an indicia carrying disc that is rotated by said pinion and calibrated to a reference marker for visual output of a value for the vertical location of said web centerline.

6. A web centerline system, as in claim 4, wherein said calibrated means is an encoder that is rotated by said pinion to output an electrical signal which is referrable to the vertical location of said web centerline.

7. A web centerline system, as in claim 1, in combination with a vertically adjustable horizontally disposed drill spindle assembly, wherein said indicator means indicates an arbitrary value for said vertical location of the web centerline and said arbitrary value is calibrated with vertical adjustment means on said drill spindle assembly to allow gaging of said spindle assembly with respect to said centerline.

8. A web centerline system, as in claim 7, wherein said indicator means further comprises an indicia carrying disc means for visually outputting said arbitrary value, and said drill psindle adjustment means includes a second indicia carrying disc means calibrated for manual vertical adjustment of the drill spindles with respect to said centerline location.

9. A web centerline system, as in claim 7, which the interconnection means to said bellis center section further comprises a first pair of bellis supporting arms commonly mounted at their respective first ends to pivot, in vertical plane, about a first common horizontal axis on said first block, and a second pair of bellis supporting arms commonly mounted at their respective first ends to said second bellis block to pivot, in a vertical plane, about a second common horizontal axis on said second block, wherein the second ends of each of said support bars are pivotably connected to said bellis center section, and define a four bar linkage between said first and second bellis blocks.

10. A web centerline system, as in claim 9, wherein each of said four supporting bars are of equal length, and said bellis center section further comprises a horizontally disposed rod having a third and a fourth bellis block horizontally slideable thereon, with the second end of one support, from said first pair of support bars, pivotably mounted together with the second end of one support bar, from said second pair of support bars, upon each of said third and fourth bellis blocks.

11. A web centerline system, as in claim 7, wherein said indicator means further comprises a vertically disposed rack which is connected, at a proximate end, to said bellis center section and vertically extends to a distal end, wherein a pinion gear is rotatably engaged by said rack and said pinion is connected to a calibrated means for outputting an indication of the vertical location of said web centerline.

* * * * *